W. A. TURBAYNE.
ELECTRICAL SYSTEM OF DISTRIBUTION.
APPLICATION FILED FEB. 23, 1910.
1,033,357.
Patented July 23, 1912.
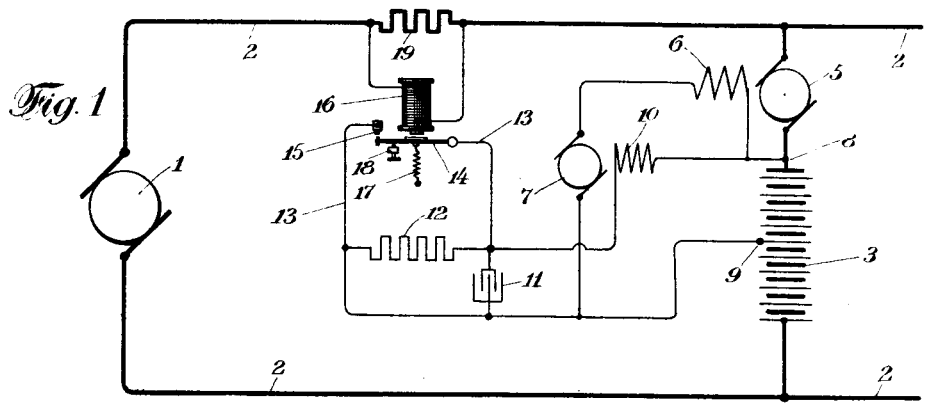
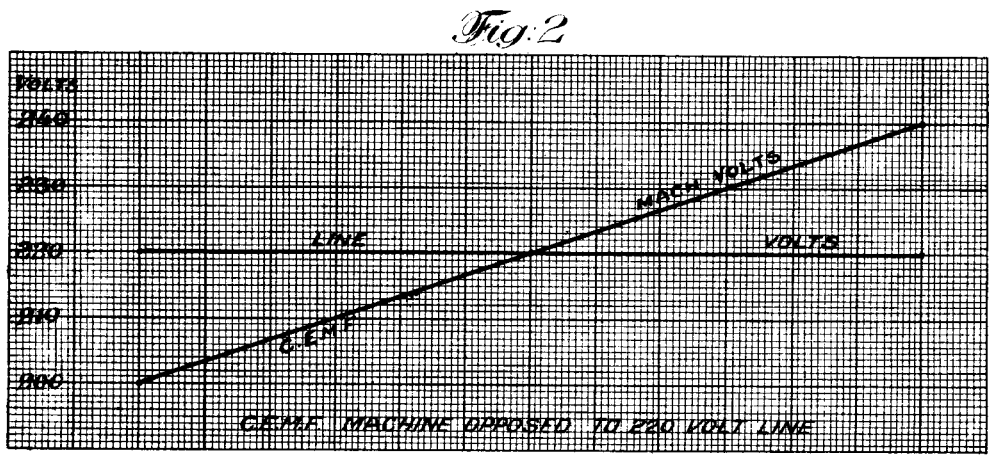
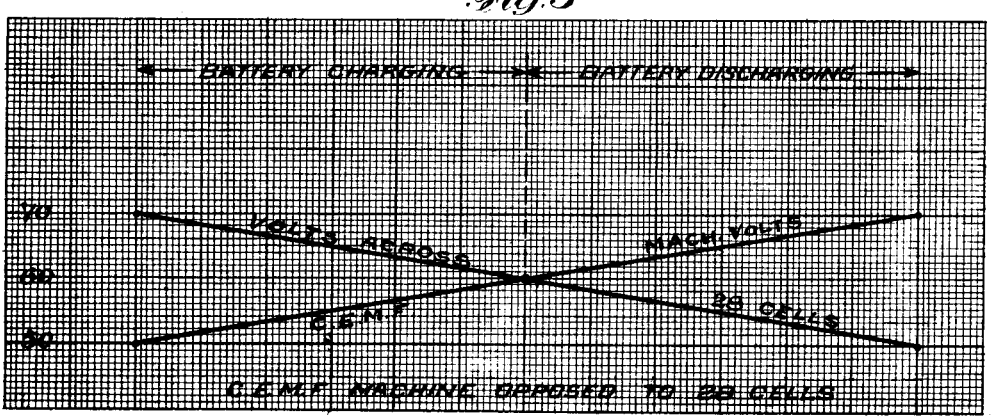
Witnesses:
J. O. Gensler
Geo. M. Harris
Inventor
William A. Turbayne
By his Attorneys
Kenyon & Kenyon

UNITED STATES PATENT OFFICE.

WILLIAM A. TURBAYNE, OF LANCASTER, NEW YORK, ASSIGNOR TO GOULD STORAGE BATTERY COMPANY, A CORPORATION OF NEW YORK.

ELECTRICAL SYSTEM OF DISTRIBUTION.

1,033,357.  Specification of Letters Patent.  Patented July 23, 1912.

Application filed February 23, 1910. Serial No. 545,275.

*To all whom it may concern:*

Be it known that I, WILLIAM A. TURBAYNE, a citizen of the United States, and a resident of Lancaster, in the county of Erie and State of New York, have invented certain new and useful Improvements in Electrical Systems of Distribution, of which the following is a specification.

My invention relates to electrical systems of distribution and more especially to such systems wherein there is provided a compensatory storage battery with automatic means for regulating the charge and discharge of the storage battery to suit the needs of the system.

One object of my invention is to provide such a system with regulating apparatus which will efficiently regulate more accurately to the desired values and in which a minimum amount of apparatus is required.

A further object of my invention is to utilize the variations of battery voltage on charge and discharge to cut down the duty imposed upon the regulating apparatus and therefore cut down its size.

Further objects, features and advantages will more clearly appear from the detailed description given below taken in connection with the accompanying drawing which forms a part of this specification and illustrates a preferred embodiment of my invention.

Referring to the drawing, Figure 1 is a diagrammatic view of a system provided with one form of my improved regulating arrangement. Fig. 2 is a diagram illustrating the necessary variations in voltage of certain regulating machines hithertofore used. Fig. 3 is a similar diagram but illustrating the variations in voltage utilized in connection with one of the regulating machines of my improvements.

Referring to Fig. 1, 1 represents a main generator feeding the circuit 2, 2. Connected across the circuit 2, 2 is a storage battery 3 and in series therewith a regulating dynamo or booster 5. For exciting the field 6 of the booster 5 I provide an exciter dynamo or counter-electromotive force machine 7 connected in series with the field 6 and across the battery at the points 8 and 9. Under certain conditions, in which the voltage across the circuit 2, 2 is substantially 220 volts, I prefer that the number of cells between the points 8 and 9 shall be 28. The field 10 of the exciter 7 is also connected across the battery at the points 8 and 9 and in series with this field I provide a condenser 11, a resistance 12 and a controlling circuit 13. The condenser 11, resistance 12 and circuit 13 are, however, in parallel with one another. In series in the controlling circuit 13 is a vibrating armature 14 arranged to open and close the circuit 13 at the contact 15. 16 illustrates an electromagnetic coil for controlling the vibrations of the armature 14. A spring 17 acts in opposition to the coil 16 and a stop 18 is provided to limit the movement of the armature 14. The coil 16 is connected across a shunt 19 in series in the circuit 2, so that variations of load current in this circuit will be measured by the strength of the coil 16.

In certain prior systems it has been suggested that the booster for regulating the action of the battery be excited by means of a counter-machine, the armature of which is connected in series with the booster field and directly across the mains 2, 2. With such an arrangement the operation of the system described would be as follows. With a normal average load upon the system the strength of coil 16 would be such that it would produce vibrations of the armature 14, slightly increasing and decreasing the field strength of the exciter 7 so that the booster voltage would operate to keep the battery in a substantially floating condition. If, however, an excess load should fall upon the circuit the strength of coil 16 would increase responsive thereto, thereby increasing the length of time during which the circuit 13 is closed, so that the exciter field strength is materially increased, thereby increasing the booster field strength and causing the battery to discharge so that substantially all of the excess load is taken by the battery 3. In a similar manner if a decrease of load occurs on the system the coil 16 becomes weaker so that the vibrations of the armature 14 operate to maintain the circuit 13 open more of the time, thus decreasing the exciter field strength and consequently the booster field strength and allowing the battery to charge the circuit 2 in order to equalize the load upon the system. The condenser 11 is included in order that the sparking may be reduced to a minimum.

If we assume that the maximum booster excitation for maximum booster effect in either direction requires 20 volts and that the voltage of the circuit 2, 2 is 220 volts the counter-machine 7 must develop 240 volts to give the booster its maximum effect on discharge. Assuming a 10 ampere booster field current this necessitates that the exciter develop an output of 2400 watts. These variations in voltage are illustrated in Fig. 2, in which the line voltage is shown at 220 volts by the horizontal line, while the counter-machine voltage is represented by the slanting line. It is there shown when the booster voltage is at a maximum in the discharging direction that the counter-machine must produce 240 volts, while when the battery with the maximum booster effect is charging the counter-machine develops 200 volts.

In order to cut down the size of the exciter 7 I connect the same directly across the battery at the points 8 and 9, as clearly shown in Fig. 1. The opposing voltage to the machine 7 is then that of a portion of the cells of the battery, which in the specific instance shown in the figures, is 28 cells. Under these conditions the opposing electromotive force of the battery varies from 70 to 50 volts, depending upon whether the battery is charging or discharging. Thus when the battery is charging the maximum voltage of the 28 cells is 70 and in order to produce the 20 volts excitation for the booster it is only necessary for the counter-machine to produce 50 volts. In a similar manner when the battery is discharging at its maximum the voltage of the 28 cells will be approximately 50 volts. Therefore, in order to produce the 20 volts excitation for the booster field to cause this maximum discharge it is only necessary for the counter-machine 7 to produce 70 volts in order to get the required 20 volts for the excitation of the counter-machine. Therefore, with the 10 ampere current for the exciter 7, before assumed, and with the maximum voltage of the counter-machine 7 at 70 volts the exciter of the counter-machine need only be 700 watts. These voltages are clearly shown in Fig. 3. It will, therefore, be apparent that by utilizing the variation of the battery on charge and discharge that I very materially cut down the capacity and size of the counter-machine 7, which at the same time reduces the duty imposed upon the other regulating apparatus therefor. In alternating current systems the electromagnet may be influenced by the alternating line current in a well known manner.

By providing a regulating apparatus of the character described a considerable reduction in the size and cost of the same is permitted, one reason being in prior systems a very large amount of copper was required on the field windings of the various machines in order that the required ampere turns might be obtained at a sufficiently low voltage drop across the shunt 19, without causing an excessive amount of energy to be expended in the shunt. Furthermore, if the field of the counter machine or other regulating machine were directly excited from the main shunt as is customary in certain prior systems, the arrangement of the counter machine or its field or both connected across the battery, is subject to serious disadvantages. For instance, in some such prior systems it is usual to obtain full booster excitation with a variation of about five per cent. above or below the normal line voltage. The battery on the other hand will, upon charge and discharge, vary about twenty per cent. above and below the normal voltage respectively, and with the counter machine connected across the battery an accumulative action will be obtained which would require much greater changes in generator current to bring the booster back to a neutral condition than would be the case if the counter machine was simply connected across the line. By the inclusion of the vibratory regulator, however, advantage may be taken of this battery regulation, as the vibrating armature holds the counter machine voltage between two extreme conditions, either of which will permit a variation in the voltage of the counter machine above or below normal, much greater than that obtained across the battery or that portion of the battery across which the machine is connected.

Although I have described my improvements in great detail nevertheless I do not desire to be limited to such details, except as clearly specified hereinafter in the claims, since many changes and modifications may be made within the spirit and scope of my invention.

What I claim as new and desire to secure by Letters Patent of the United States, is:

1. In a system of distribution, a generator, a circuit supplied thereby, a storage battery and booster connected across the circuit, an electromagnet connected to be responsive to current variations of the circuit between the generator and battery, an exciting dynamo connected in series with the booster field and opposed to part of the cells of the battery, a field coil for the exciting dynamo connected across part of the cells of the battery, a resistance in series with said field coil, a shunt circuit around said resistance and a vibrating armature for opening and closing said shunt circuit, the vibrations of said armature being controlled by said electromagnet.

2. In a system of distribution, a source of electrical energy, a circuit supplied thereby, a compensatory storage battery operatively related to the circuit, a dynamo-electric machine for regulating the charge and discharge of the battery from and to the circuit, an exciter for said machine connected to the battery so as to be opposed by the varying voltage thereof, an exciting field circuit for the exciter, a vibrating armature arranged to control the current in said field circuit, and a coil arranged to control the vibrations of said armature responsive to variations in the load on said first mentioned circuit.

3. In a system of distribution, a source of electrical energy, a circuit supplied thereby, a compensatory storage apparatus operatively related to said circuit, a dynamo-electric machine arranged to regulate the discharge and charge of the storage apparatus to and from said circuit, and means affected by variations in voltage of the storage apparatus for regulating the field strength of said dynamo, said means including a controlling circuit, a vibrating armature for opening and closing said circuit, and a coil for controlling the vibrations of said armature responsive to load variations in said first mentioned circuit.

4. In a system of distribution, a source of electrical energy, a circuit supplied thereby, a battery and booster connected in series across said circuit, an exciter for the booster field and opposed by cells of the battery so that the exciter action will be affected thereby, a controlling circuit operatively related to the exciter field, a vibrating armature in said controlling circuit and a coil controlling the vibrations of said armature responsive to variations in the load on said first mentioned circuit.

5. In a system of distribution, a source of electrical energy, a circuit fed thereby, a compensatory storage battery operatively related to the circuit, a booster for regulating the discharge and charge of the battery to and from said circuit, an exciter for the booster, and means affected by variations in battery voltage for controlling the output of the exciter, said means including a controlling circuit, a vibrating armature in said circuit and a coil controlling the vibrations of said armature responsive to load variations on said source.

6. In a system of distribution, a source of electrical energy, a circuit supplied thereby, a battery and booster connected in series across said circuit, an exciter for the booster field and opposed by cells of the battery so that the exciter action will be affected thereby, a resistance and controlling circuit operatively related to the exciter field, a vibrating armature in said controlling circuit and a coil controlling the vibrations of said armature responsive to variations in the load on said first mentioned circuit.

7. In a system of distribution, a source of electrical energy, a circuit fed thereby, a compensatory storage battery in operative relation thereto, a booster for regulating the charge and discharge of the battery, an exciter for the booster opposed to part of the cells of the battery and means for regulating the exciter field strength responsive to variations in load on said circuit, said means including a vibratory armature in series with the exciter field and a controlling coil therefor in series in said circuit.

8. In a system of distribution, a generator, a circuit supplied thereby, a storage battery and booster connected across the circuit, an electromagnet connected to the circuit between the generator and battery to be responsive to current variations of the generator, an exciting dynamo connected in series with the booster field and opposed to part of the cells of the battery, a field coil for the exciting dynamo connected across part of the cells of the battery, a resistance and condenser in series with said field coil, a shunt circuit around said resistance and a vibrating armature for opening and closing said shunt circuit, said electromagnet attracting and releasing said armature to regulate the vibrations thereof.

In testimony whereof, I have signed my name to this specification, in the presence of two subscribing witnesses.

WILLIAM A. TURBAYNE.

Witnesses:
JAMES McGRATH,
LE ROY DE CORN.

Copies of this patent may be obtained for five cents each, by addressing the "Commissioner of Patents, Washington, D. C."